Figure 1:
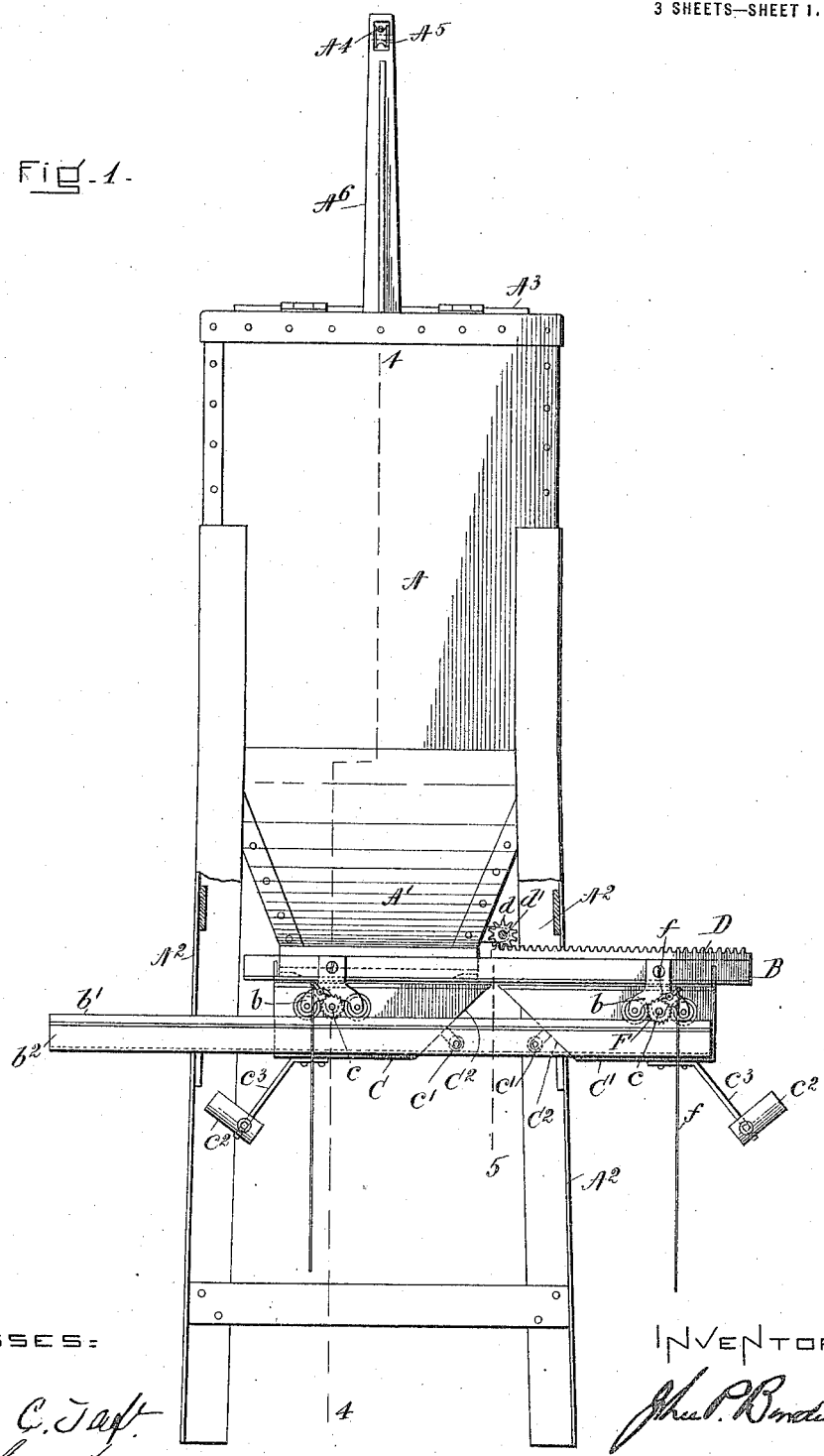

J. P. BOWDITCH.
MANURE LOADER.
APPLICATION FILED APR. 21, 1913.

1,184,612.

Patented May 23, 1916.
3 SHEETS—SHEET 1.

WITNESSES:
INVENTOR:

J. P. BOWDITCH.
MANURE LOADER.
APPLICATION FILED APR. 21, 1913.
1,184,612.
Patented May 23, 1916.
3 SHEETS—SHEET 2.
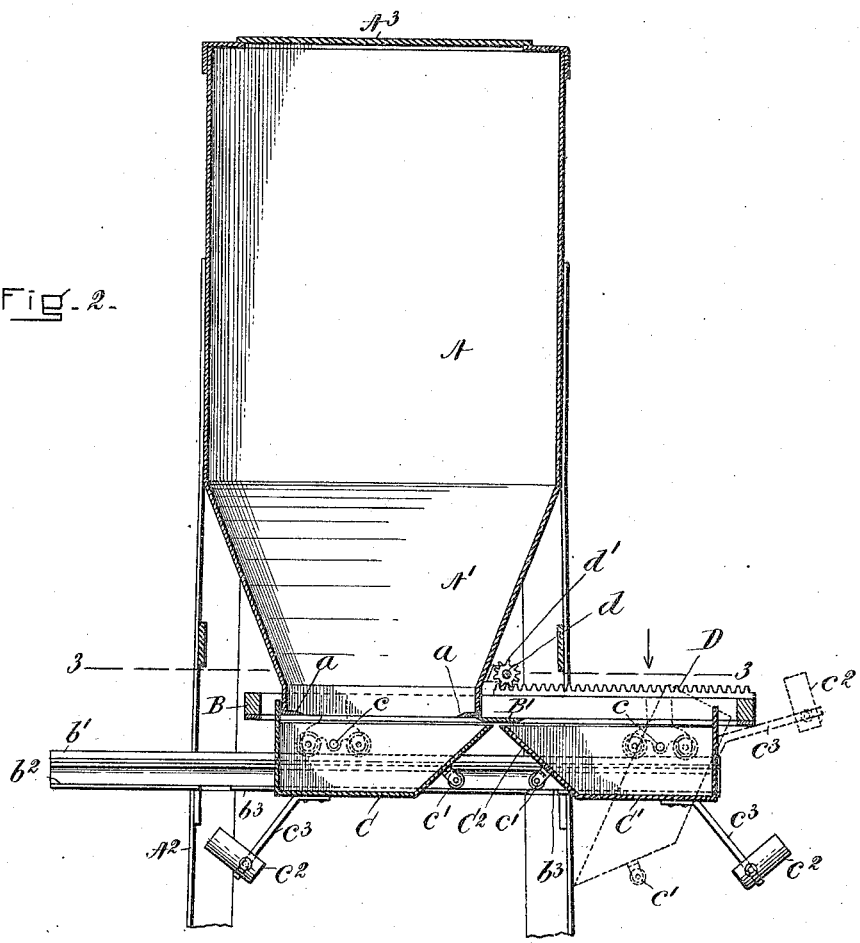
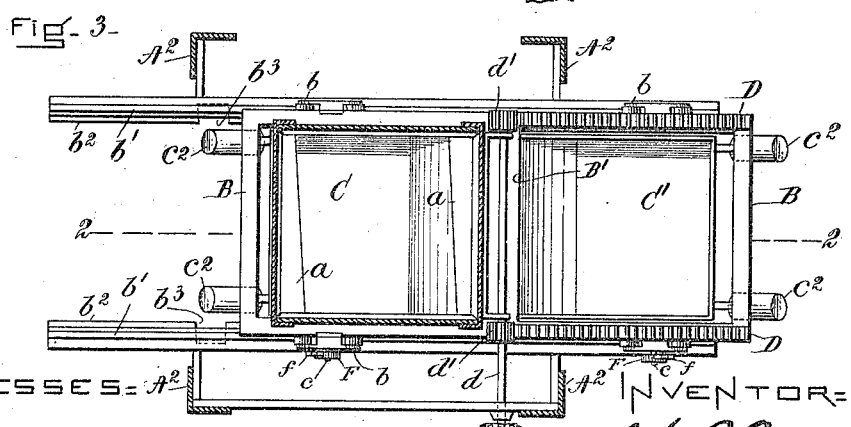
WITNESSES:
Don C. Taft
Fed E Bennett
INVENTOR:
John P. Bowditch

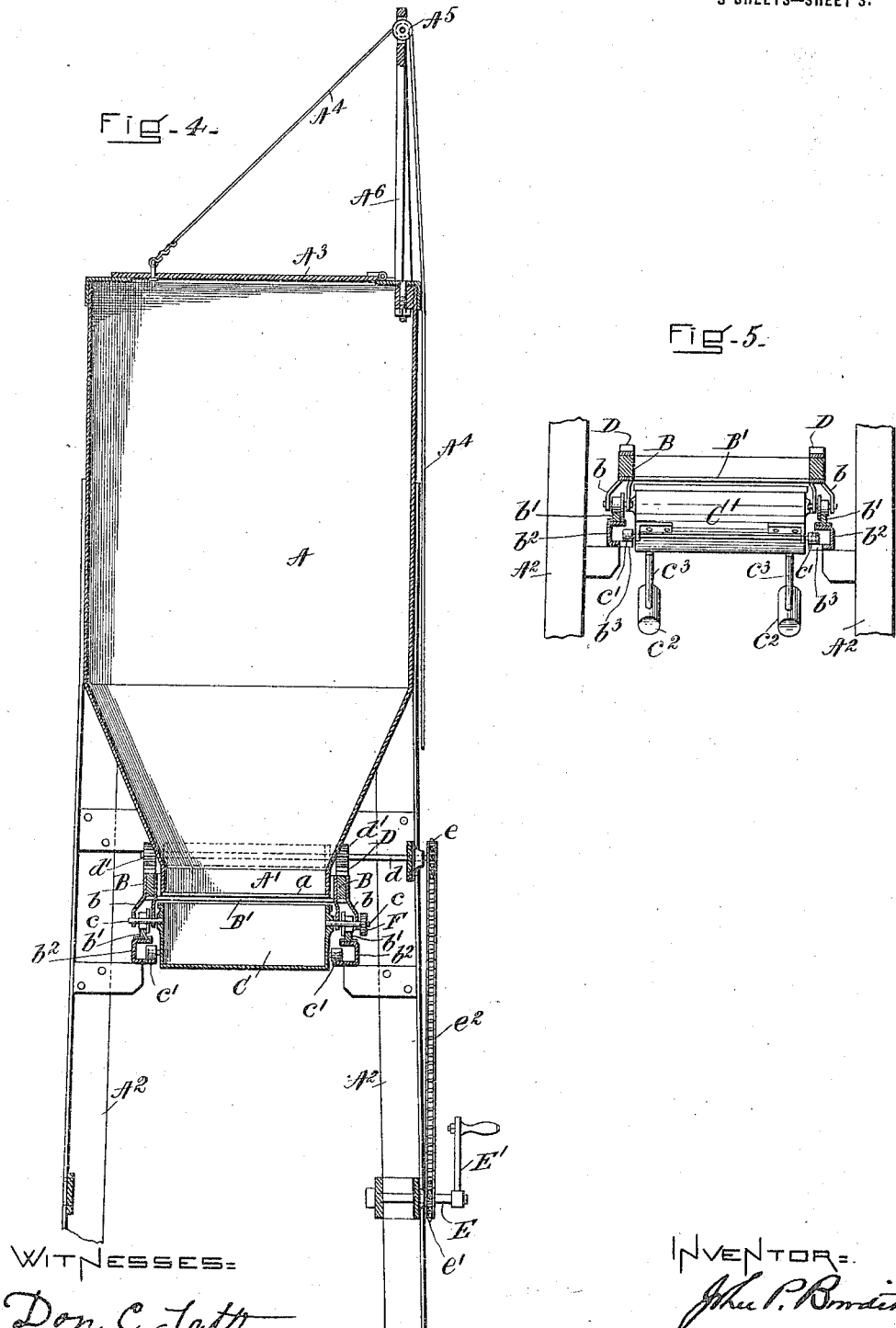

UNITED STATES PATENT OFFICE.

JOHN P. BOWDITCH, OF FRAMINGHAM, MASSACHUSETTS.

MANURE-LOADER.

1,184,612.  Specification of Letters Patent.  Patented May 23, 1916.

Application filed April 21, 1913. Serial No. 762,700.

*To all whom it may concern:*

Be it known that I, JOHN P. BOWDITCH, of Framingham, in the county of Middlesex and State of Massachusetts, a citizen of the United States, have invented a new and useful Improvement in Manure-Loaders, of which the following is a specification.

My invention relates to an improvement in means for keeping and loading manure though it may be used for other purposes.

It comprises a hopper into which the manure may be dumped, for example, by a movable flooring such as is described in my application for Letters Patent Serial No. 705,357, filed June 24, 1912, or in any other convenient way and from which it may be withdrawn in a fixed quantity.

My device is especially adapted for use with manure spreaders the filling of which by a fork takes considerable time. By my invention each spreader is filled at one momentary operation by the dumping of a car which is of substantially the same capacity as the spreader. The hopper is provided with a cover so that the manure cannot attract flies and become their breeding place.

My invention will be understood by reference to the drawing in which is shown the best form of my invention now known to me.

Figure 1 is a side elevation of a machine embodying my invention. Fig. 2 is a vertical section on line 2—2 of Fig. 3. Fig. 3 is a horizontal section on line 3—3 of Fig. 2. Fig. 4 is a vertical section on line 4—4 of Fig. 1, and Fig. 5 is a section on line 5—5 of Fig. 1.

A is the container or hopper the walls at the lower end of which preferably narrow in to form a mouth $A^1$ of convenient size for loading. The hopper is mounted on uprights $A^2$ so as to be a convenient height from the road, that is, so that a spreader or team may be conveniently driven under it to be filled. The hopper is closed by a hinged top $A^3$ which may be lifted by a rope $A^4$ passing over a pulley $A^5$ on top of an upright $A^6$. Under the mouth of the hopper there is mounted a carrier which comprises a rectangular frame B in which are pivotally mounted two cars C, $C^1$ of any convenient shape. As shown, the frame B is mounted on trucks $b$ which run on rails $b^1$, these rails being supported from the uprights $A^2$ and extending beyond them, so that each car may be brought in turn under the hopper to receive its load after which it is moved into dumping position while the other car is being filled.

The rails $b^1$ are laid on U-shaped angle beams $b^2$ (see Figs. 2, 4 and 5) which are supported from the uprights $A^2$. The rails and beams $b^1$ project outward from under the hopper sufficiently to allow each car to be moved clear from under the hopper while the other car is moved into position under the hopper to receive its load.

Each car is hung on trunnions $c$ supported in the trucks $b$, the trunnions being on one side of the center of gravity of the car. Thus the car will be self-dumping and preferably a portion of the floor of each car farthest from the trunnions slants as shown at $C^2$ so that the contents of the car will readily free itself and fall into the spreader below when the dumping operation takes place.

To hold the car normally in horizontal or retaining position I prefer to provide supporting rolls $c^1$ for each car which rolls run on the track formed by the lower inner surface of the beams $b^2$. At $b^3$, however, a portion of this surface is cut away so that when in its travel one of the cars reaches this point the load will cause its supporting rolls $c^1$ to fall through the opening so that the car will take the position shown in dotted lines in Fig. 2 and the load will fall off into the cart or spreader below. This is a convenient means for tipping the car but other well known means may be adopted.

To right the car after it has been freed from its load I provide counterweights $c^2$ adjustably mounted on rods $c^3$ extending from the outer ends of the cars. These weights are adjusted to overbalance the lower end of the car so as to bring it into horizontal position when empty, the rolls $c^1$ passing up through the cutaway portions $b^3$ of the beams $b^2$ so that as the car returns to its position under the hopper the rolls will travel along the beams.

I prefer to provide one trunnion on each car with a ratchet F which turns with the car when the car dumps and to provide a pawl $F^1$ for each ratchet, the pawl being mounted on the adjoining truck $b$ and provided with a rope $f$ by which it may be controlled from below. Such a mechanism will hold the car in dumping position until it is emptied when by pulling the rope *f* it will be free to right itself.

The frame B is provided with two racks D one mounted on each side. A shaft *d* mounted in suitable bearings on the lower end of the hopper carries pinions $d^1$ each of which meshes with one of the racks D and it also carries a sprocket *e*. A shaft E mounted on one of the uprights $A^2$, carries a sprocket $e^1$ over which and the sprocket *e* runs a chain $e^2$ so that by turning a crank $E^1$ carried by the shaft E the frame B is moved from end to end of the rails $b^1$. The frame B also carries a knife blade $B^1$ having both edges sharpened and at the mouth of the hopper are two blades *a* the opposing edges of which are at an angle to the walls of the mouth of the hopper, these blades being located to coact with the blade $B^1$ of the frame.

The stationary portions of the machine may be built of concrete, wood or sheet metal as thought best, the moving parts of appropriate materials and the machine may be located in any convenient spot, preferably where it can be conveniently loaded. The hopper being filled and its bottom being closed by one of the cars say $C^1$, the car will be filled with manure.

By turning the crank E the frame carrying the cars will be moved into the position shown in Fig. 2 when the supporting roll *c* will fall through the cutaway portions $b^3$ of the beams $b^2$ and the car will take the position shown in dotted lines in Fig. 2, dumping its load into the spreader below and being held in position by the pawl $F^1$. When the load has been dumped the rope *f* may be pulled to disengage the pawl and free the car, and the counter-weights will bring the car into horizontal position again, and, the supporting rolls being lifted to the level of their running surface on the U beam the crank $E^1$ on being turned will move the car $C^1$ under the hopper to be refilled while the car C will be dumped.

During its travel the blade $B^1$ will coact with one of the blades *a* to cut any bedding straw or the like which may be in the manure with a shear cut so that each car in turn will carry away a substantially level load.

The mechanism above described is very simple and the invention may be embodied in other construction, but the above is the best form of construction now known to me.

The apparatus as a whole will save much time in loading a spreader and when filled automatically, for example by such mechanism as is shown in my application above referred to, will require practically no attention except momentarily from the man in charge of the barn floor and the man in charge of the spreader, and the danger from breeding flies will be reduced to a minimum because the manure will be always confined in the hopper which will be covered at the top and closed at the bottom by one of the cars. If but one car is desired, one section of the frame B may be closed by a flat flooring which will slide under the mouth of the hopper as the frame moves to bring the car into dumping position.

To prevent the carrier from being moved too far in either direction I make the end wall $c^4$ of each car sufficiently high to engage the lower end of the hopper and act as a stop.

What I claim as my invention is:—

1. In a device of the kind described, a hopper, a carrier comprising a frame, means for supporting said carrier under said hopper, means for reciprocating said carrier, two cars each having side and end walls and a floor, one of said end walls slanting upwardly and outwardly from said floor to form an overhang, means attached to the side walls of each car for pivotally mounting said car in said frame, said pivotal means being off the center of gravity of said car whereby when said car is loaded it will tend to rock and dump its load, means for holding each car in receiving position when under the hopper, and during a portion only of its reciprocation whereby each car will dump its load when it reaches a dumping position.

2. In a device of the kind described, a hopper, a carrier comprising a frame, means for supporting said carrier under said hopper, means for reciprocating said carrier, two cars each having side and end walls and a floor, one of said end walls slanting upwardly and outwardly from said floor to form an overhang, means attached to the side walls of each car for pivotally mounting said car in said frame, said pivotal means being off the center of gravity of said car whereby when said car is loaded it will tend to rock and dump its load, means for holding each car in reeciving position when under the hopper, and during a portion only of its reciprocation whereby each car will dump its load when in dumping position, and means for holding the dumping car in dumping position at will.

3. In a device of the kind described, a hopper, a carrier comprising a frame, and across means for supporting said carrier under said hopper, means for reciprocating said carrier, two cars each of said cars having side and end walls and a floor, means attached to the side walls of each car for pivotally mounting said car in said frame whereby it may be rocked to dump its load, means for holding each car in receiving position when said car is under said hopper, and during a portion of its reciprocation whereby it may dump its load when in dumping position, said carrier having a double-edged blade located over the adjacent ends of said cars, and said hopper having two blades one located at each side thereof to coöperate with the blade on said carrier.

4. In a device of the kind described, a hopper, a carrier comprising a frame, means for supporting said carrier under said hopper, means for reciprocating said carrier, two cars each having side and end walls and a floor, one of said end walls slanting upwardly and outwardly from said floor to form an overhang, the overhangs of each car approaching each other, means attached to the side walls of each car for pivotally mounting said car in said frame, said pivotal means being off the center of gravity of said car whereby when said car is loaded it will tend to rock and dump its load, and means for holding each car in receiving position when under the hopper, and during a portion only of its reciprocation whereby each car will dump its load when in dumping position.

5. In a device of the kind described, a hopper and a carrier comprising a frame, trucks supporting said frame and two cars each adapted to close the mouth of said hopper and having supporting rolls, rails adapted to support said trucks and upon which said carrier may be moved, and means for moving said carrier on said rails, tracks for said supporting rolls, said tracks being cut away whereby said rolls will fall through said cutaway portion and allow the cars to dump.

6. In a device of the kind described, a hopper and a carrier having trucks, cars pivotally supported in said trucks and adapted to receive their loads in turn from said hopper, rails upon which said trucks may run, means for dumping each loaded car and means for holding said car in dumping position, and means adapted to be operative when said car is not held in dumping position to bring said car into horizontal position.

JOHN P. BOWDITCH.

Witnesses:
GEORGE O. G. COALE,
M. E. FLAHERTY.

Copies of this patent may be obtained for five cents each, by addressing the "Commissioner of Patents, Washington, D. C."